United States Patent
Njavro et al.

(10) Patent No.: US 12,251,710 B2
(45) Date of Patent: Mar. 18, 2025

(54) RECOVERY OF VALUABLE COMPONENTS FROM A WASTE STREAM

(71) Applicant: Micro Fines Recycling Holdings, Pompano Beach, FL (US)

(72) Inventors: Jerry Ryan Njavro, Pompano Beach, FL (US); Samuel P. Jacobs, Pompano Beach, FL (US)

(73) Assignee: Micro Fines Recycling Holdings, Pompano Beach, FL (US)

( * ) Notice: Subject to any disclaimer, the term of this patent is extended or adjusted under 35 U.S.C. 154(b) by 160 days.

(21) Appl. No.: 17/861,933

(22) Filed: Jul. 11, 2022

(65) Prior Publication Data

US 2024/0009682 A1     Jan. 11, 2024

(51) Int. Cl.
  *B03B 9/06*     (2006.01)
  *B09B 3/35*     (2022.01)
  *B09B 101/05*     (2022.01)

(52) U.S. Cl.
  CPC .............. *B03B 9/061* (2013.01); *B09B 3/35* (2022.01); *B09B 2101/05* (2022.01)

(58) Field of Classification Search
  CPC ........ B03B 9/061; B09B 3/35; B09B 2101/05
  See application file for complete search history.

(56) References Cited

U.S. PATENT DOCUMENTS

| | | |
|---|---|---|
| 2,257,325 A | 9/1941 | Black |
| 3,774,855 A | 11/1973 | Wolf |
| 3,777,994 A | 12/1973 | Fischer |
| 4,753,660 A | 6/1988 | Kellerwessel et al. |
| 5,829,694 A * | 11/1998 | Chapman .............. C22B 11/025 241/DIG. 38 |
| 6,086,000 A | 9/2000 | Murata |
| 7,681,818 B2 | 3/2010 | Peterson et al. |

(Continued)

FOREIGN PATENT DOCUMENTS

| | | |
|---|---|---|
| IN | 271028 B | 1/2008 |
| JP | 2008232522 A | 10/2008 |

(Continued)

OTHER PUBLICATIONS

Weihua Crane, PF Impact Crusher, Apr. 15, 2019, https://web.archive.org/web/20190415115007/http://weihuacraneglobal.com/product/Impact-Crusher.html (Year: 2019).*

(Continued)

*Primary Examiner* — Jacob S. Scott
*Assistant Examiner* — Miraj T. Patel
(74) *Attorney, Agent, or Firm* — Finch & Maloney PLLC

(57) ABSTRACT

A process for separating components of a waste stream. In one embodiment, the process includes providing shredded material in a form of particles each having a size of less than 2 inches. The particles of shredded material are separated based on size into a plurality of streams. Each of the plurality of streams is separated, based on density, into a first substream of greater density and a second sub stream of lesser density. Brittle components of each first substream are pulverized, leaving metallic components in sheet form. Metallic components are separated from the first substream after the pulverizing. The process can be utilized to recover metals from automobile shredder residue, such as copper, aluminum, and precious metals.

17 Claims, 2 Drawing Sheets

(56) References Cited

U.S. PATENT DOCUMENTS

| | | |
|---|---|---|
| 10,273,559 B2 | 4/2019 | Conway |
| 11,103,876 B2 | 8/2021 | Conway |
| 11,629,390 B2 | 4/2023 | Conway |
| 11,970,754 B2 * | 4/2024 | Conway .............. B02C 17/1855 |
| 2015/0136663 A1 | 5/2015 | Valerio |
| 2017/0209870 A1 | 8/2017 | Valerio |
| 2019/0211419 A1 | 7/2019 | Conway |
| 2022/0145419 A1 | 5/2022 | Conway |
| 2022/0396850 A1 | 12/2022 | Conway |

FOREIGN PATENT DOCUMENTS

| | | |
|---|---|---|
| TW | 201510027 A | 3/2015 |
| WO | 2009/067570 A1 | 5/2009 |
| WO | 2011011523 A1 | 1/2011 |

OTHER PUBLICATIONS

Recover Max Website, Recover Precious Metals with the RecoverMax Fines Process, available at https://www.bpsvibes.com/products/recycling-equipment/recovermax-fin (visited May 16, 2022).

Toto, Deanne, "Extracting the Most Value," Recycling Today, (Dec. 2016).

General Kinematics, ASR Vibra-Drum Grinding Mills, https://www.generalkinematics.com/product/vibra-drum-grinding-mills/ (visited Jun. 20, 2023).

Eberhard Gock, et al., Eccentric Vibratory Mills—Theory And Practice, Powder Technology, 105 (1999) 302-310, Elsevier Science S.A.

* cited by examiner

RECOVERY OF VALUABLE COMPONENTS FROM A WASTE STREAM

TECHNICAL FIELD

The present disclosure relates to recycling and material handling, and more particularly to a process for recovering valuable components from a waste stream.

BACKGROUND

Ten to fifteen million cars each year in the US reach their end of life. Although these cars out of commission, these cars each contain a variety of components and materials that can be reused or recycled. In one approach, the recycling process begins with removing the wheels and tires, battery, and catalytic converter. Fluids are drained, such as engine coolant, oil, transmission fluid, air conditioning refrigerant, and gasoline. Certain valuable items may be removed from the body for resale on the used market. For example, electronic modules, alternators, starter motors, infotainment systems, complete engines, and transmissions may be resold in "as-is" used condition or sold to a remanufacturer for restoration. Further processing may include removing the air conditioner evaporator, heater core, and wiring harnesses. The remaining shell is then crushed flat, or cubed, for transportation to an industrial shredder or hammer mill, where the shell is reduced to fist-sized chunks.

Removing components from the vehicle body has traditionally been done by hand, and therefore is labor intensive. Accordingly, it is often uneconomical to remove many of the parts. In such cases, the car may be shredded along with these components attached. In either case, shredding a car results in a mixture of ferrous metals (e.g., steel), non-ferrous metal (e.g. alloys of copper and aluminum), and shredder waste. The shredder waste is sometimes referred to as automotive shredder residue or automobile shredder residue (ASR). ASR may include glass, textile fibers, rubber, automobile liquids, plastics and dirt.

SUMMARY

The present disclosure is directed to a process for separating components from a waste material stream. In one embodiment, the process is adapted for processing automobile shredder residue (ASR) and is useful to remove non-ferrous metals and other recyclable materials from ASR that cannot be removed using magnetic attraction. For example, the process is particularly suited for recovering copper, aluminum, and precious metals from ASR. The process can similarly be used with waste streams from other industries, including appliances, electronics, household goods and mixed recycling streams, for example.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Figure 1:
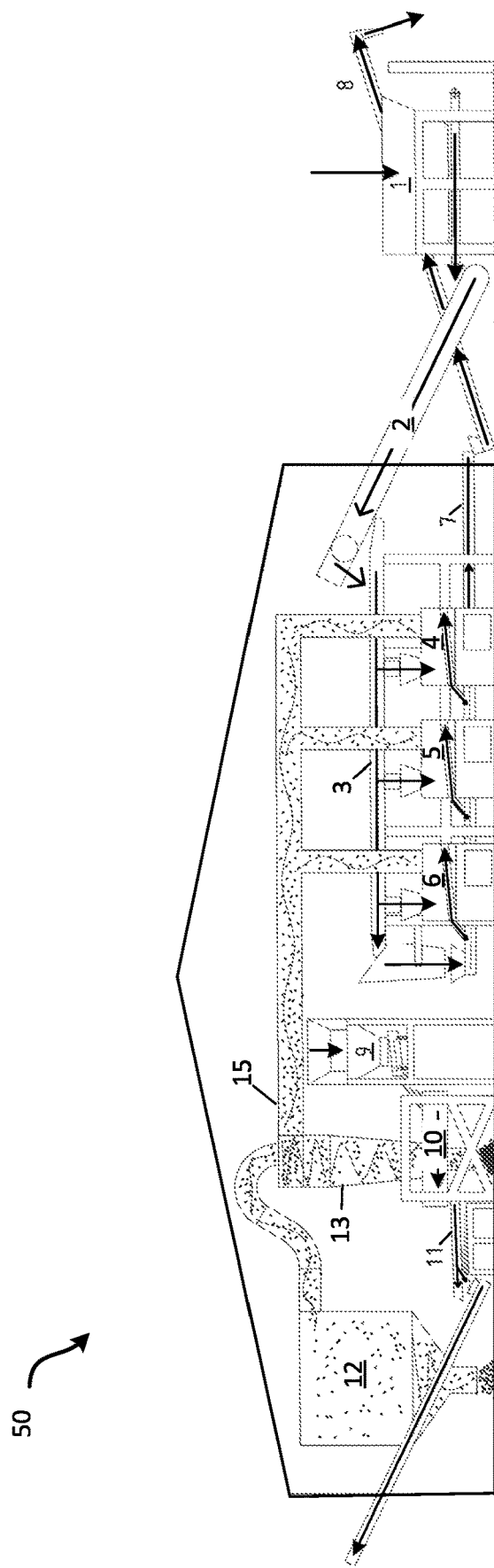
FIG. 1 is a diagram showing components of a separation process for a waste stream, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed is a process for separating desirable components from a waste stream, such as automobile shredder residue. In one embodiment, the process includes providing material in a form of particles, at least 95% of which has a size of less than 2 inches. The particles of shredded material are separated based on size into a plurality of streams. For example, a deck screener separates the particles into three streams including a first stream with particle sizes up to 2 mm in size, a second stream with particle sizes between 2 mm and 6 mm, and a third stream of particles with a size of 6 mm and greater. Each of the plurality of streams is then separated, based on density, into a first substream of greater density and a second substream of lesser density. For example, an air table can separate the particles into a first substream having a density of at least 6 g/cm$^3$ and a second, lighter stream having a density of less than 6 g/cm$^3$. The density value used to separate metallic materials from non-metallic materials can have any value from 2 g/cm$^3$ to 20 g/cm$^3$, depending on the density of materials in the waste stream and the particular product(s) sought to be collected from that waste stream. Brittle components of each first substream are pulverized, such as glass, rock, and plastics, leaving metallic components in sheet form. A dowel mill or impact crusher can be used, for example. Metallic components in sheet form are separated from the powder after the pulverizing. In some cases, precious metals have a smaller size than copper and aluminum, and therefore can be separated on the basis of size after recovering these metals from the pulverizing process. The process can be utilized to recover metals from automobile shredder residue, such as copper, aluminum, and precious metals.

Overview

After shredding an automobile, ferrous metals can be recovered using a sensor sorter. For example, pieces of a shredded automobile are transported on a conveyor belt. A sensor below the belt detects ferrous metals and an air jet is activated to blow the piece off of the belt and into a collection tray. Despite this technology, it is estimated that 75% of valuable materials are missed and not recovered. Therefore, a need exists for recovering metals and other valuable components from a waste stream to avoid these components from going to a landfill.

The present disclosure addresses this need and others by providing a process for recovering metals and other components from a waste stream. In particular, the process is suited for recovering non-ferrous metals from automobile shredder residue.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Example Process

Figure 2:
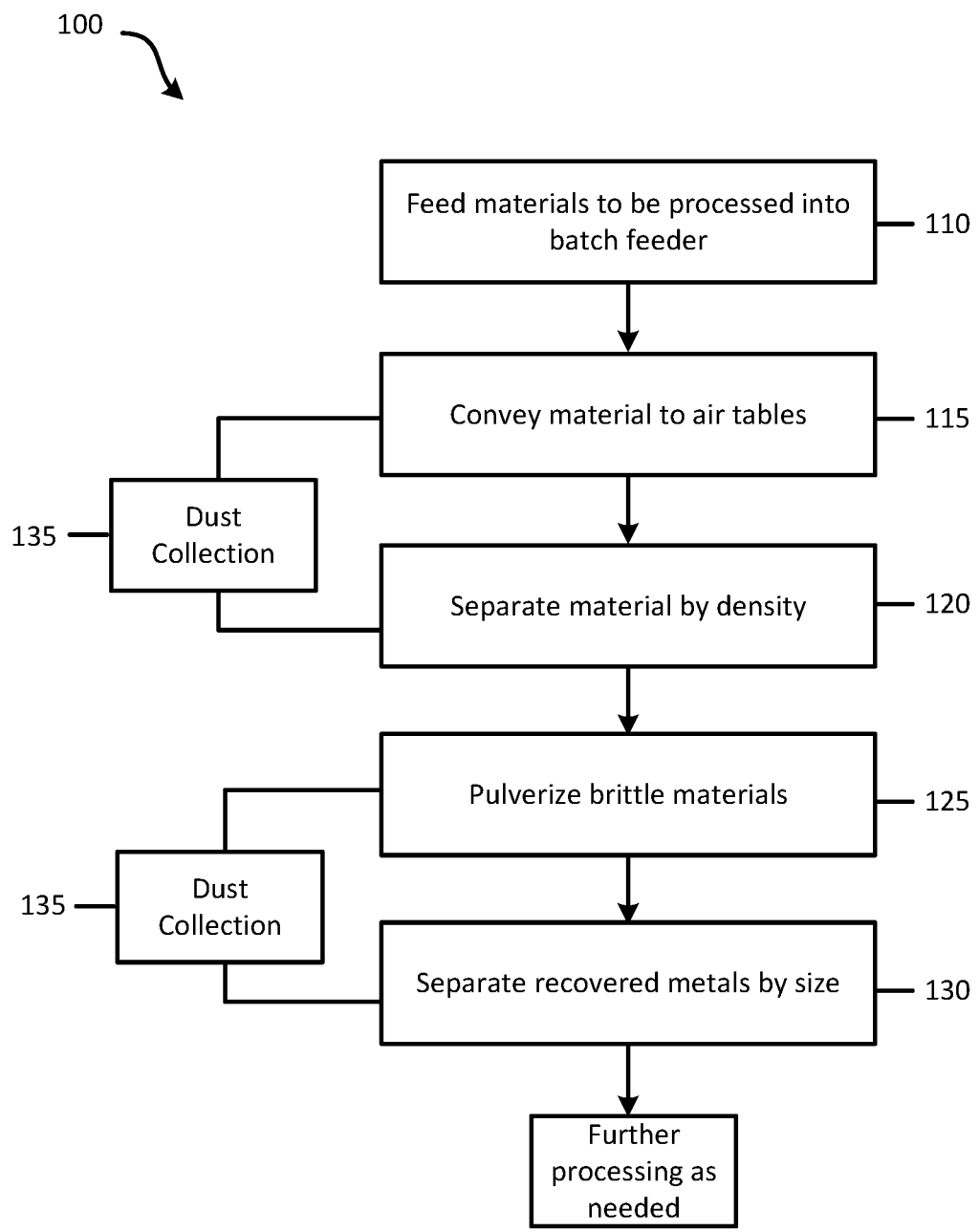
FIG. 2 is a flow chart showing processes in a method of separating materials from a waste stream, in accordance with some embodiments.

FIG. 1 is a diagram showing components of a separation process 50, in accordance with an embodiment of the present disclosure. FIG. 2 is a flow chart showing processes in a method 100 of recovering desired components from a waste stream, in accordance with some embodiments. These figures are discussed concurrently below.

In accordance with one embodiment, method 100 begins with process 110 in which material to be processed is placed in a batch feeder 1 and then conveyed to a deck screener 3. The material to be processed can include shredded cars, appliances, electronics, and/or other materials. In some embodiments, the material to be processed primarily or entirely consists of automobile shredder residue (ASR). ASR refers to the granules and chunks of material left over from the shredding process after removing ferrous metals and that traditionally was bound for a landfill. ASR can include, for example, copper wire, aluminum, and precious metals (e.g., platinum, palladium, gold, silver), some or all of which are from electronics and related components. In one embodiment, the material to be processed consists essentially of granules or chunks with a size of 1" (~25 mm) or smaller. For example, 95%, 98%, or 99% the material to be processed has a size of 1" or smaller, where the remainder can be granules somewhat greater than 1" in size. In other embodiments, the starting material consists essentially of granules or chunks with a size of 1.5" (~38 mm) and smaller, or 2" (~51 mm) and smaller, for example.

In process 115, the material to be processed is moved via conveyor belt 2 from the batch feeder 1 to a deck screener 3. The deck screener 3 separates the material to be processed by particle size. The deck screener 3 can be a vibrating screen or series of screens, similar to a sieve series, that separates the material to be processed into a plurality of streams. The material is separated into two, three, four or more streams. In one embodiment, the material is separated into three streams that include streams of small, medium, and large particles. For example, a first stream has particles with a size of less than 2 mm, a second stream has particles with a size from 2 mm to 6 mm, and a third stream has particles with a size of greater than 6 mm (e.g., 6 mm to 25 mm). In another embodiment, the first stream has particles/granules up to a maximum size selected from a range from 2 mm to 4 mm and the third stream has particles/granules greater than a minimum size selected from a range of 6 mm to 12 mm, where the second stream has particles/granules of a size between the size range in the first stream and the third stream. Process 115 can include any number of streams with particle size distributions selected for each stream as appropriate for a given application, as will be appreciated.

In process 120, each stream of material from process 115 is conveyed from the deck screener 3 to an air table 4, 5, 6, which may also be referred to as a gravity separator or gravity separation table. Each air table 4, 5, 6 is used to separate particles by weight and/or density. The air table is best suited for dry material since the material moves on a fluidized bed of air across the table. In some embodiment, the air table creates an eccentric motion and has an adjustable uphill tilt which separates heavier particles from lighter particles. As a result, lighter particles (or particles of relatively lower density) can be separated from heavier particles (or particles of relatively greater density). The uphill tilt can be adjusted and/or the air flow be adjusted to change a value of density or mass where separation occurs.

In one embodiment, the heavier or denser material travels up the slope of each air table 4, 5, 6 and into bins using positive air flow and vibration. This heavier material contains the desirable components (e.g., metals) and may be considered the product of method 100 in some embodiments. In process 125, the lighter material, often including textile fibers in large part, moves down each air table 4, 5, 6 to an auger 7 and is collected for disposal using auger 8. In one embodiment, air tables 4, 5, 6 are configured to separate materials having a density of 6 g/cm³ or greater from materials having a density less than 6 g/cm³. This density cutoff value can be adjusted as desired from 2 g/cm³ to 20 g/cm³, including density values of about 2.5 g/cm³, 3 g/cm³, 3.5 g/cm³, 4 g/cm³, 4.5 g/cm³, 5 g/cm³, 5.5 g/cm³, 6 g/cm³, 6.5 g/cm³, 7 g/cm³, 7.5 g/cm³, 8 g/cm³, 8.5 g/cm³, 9 g/cm³, 9.5 g/cm³, and 10 g/cm³, 10.5 g/cm³, 11 g/cm³, 11.5 g/cm³, 12 g/cm³, 12.5 g/cm³, 13 g/cm³, 13.5 g/cm³, 14 g/cm³, 14.5 g/cm³, 15 g/cm³, 15.5 g/cm³, 16 g/cm³, 16.5 g/cm³, 17 g/cm³, 17.5 g/cm³, 18 g/cm³, 18.5, 19 g/cm³, 19.5 g/cm³, and density ranges between any of these values. For example, a process seeking to recover primarily gold (density 19.5 g/cm³) may use a density cutoff value between 15 and 18 g/cm³.

Optionally, process 135 employs a dust collection system 15 to capture fines and dust from each air table 4, 5, 6. In one embodiment, the dust collection system 15 includes a cyclone 13 and a bag house 12 equipped with a fan for suction. Collected fines can be added to concrete or burned in a cement kiln.

In process 125, some or all of the heavier material collected from the air tables 4, 5, 6 is loaded into a batch feeder 9 that meters the material into a pulverizer 10, such as a dowel mill, a vertical shaft impactor, a horizontal shaft impactor, a hammer mill, an impact crusher, or a cage mill. For example, a vertical shaft impactor or dowel mill uses steel rods that impact and pulverize rock, glass, plastic, and other brittle materials into a dust or powder. Metals, since malleable, remain in solid form. For example, metals may be crushed flat into a thin sheet or foil. Precious metals typically have a relatively smaller size due to the small localized use of such metals in electronics manufacturing, for example. Other metals, such as copper from copper wire or conductive traces, have a relatively larger size. Dust created during process 125 can be removed using the dust collection system 15, discussed above.

In process 130, metals collected in process 125 are sent to a deck screener 11. The deck screener 11 is used to separate the relatively larger pieces of metal (typically copper and aluminum) from the relatively smaller pieces of metals (typically precious metals). The larger pieces of metal are collected in a bin as a finished first product. The smaller particles of precious metals are collected as a second product of method 100. Optionally, the second product of precious metals may be refined or further processed to further separate or purify the metals. In one embodiment, the precious metals in the second product include platinum, palladium, gold, silver, and other high-value metals. Other metals collected in the first product may include copper, aluminum. In some embodiments, the finished first product has a density of at least 6 g/cm³. A density of 6 g/cm³ corresponds to a composition of at least 80% copper and balance aluminum; a density of at least 8 g/cm³ generally indicates a high percentage of copper (>90%) in the first product. As low as 2.5-3 (Al), 10-15 mm 2.5+

Further Example Embodiments

The following examples pertain to further embodiments, from which numerous permutations and configurations will be apparent.

Example 1 is a process for separating components of a waste stream. In one embodiment, the process includes providing shredded material in a form of particles, wherein at least 95% of the particles have a size of less than 1 inch; separating, based on size, the particles into a plurality of streams; separating, based on density, each of the plurality of streams into a first substream of greater density and a second substream of lesser density; pulverizing brittle components of the first substream of greater density, leaving metallic components in sheet form; and separating the metallic components from the first substream after the pulverizing.

Example 2 includes the subject matter of Example 1, wherein the plurality of streams includes a first stream with particles having a size of less than 2 mm, a second stream with particles having a size between 2 mm and 6 mm, and a third stream with particles having a size 6 mm or more.

Example 3 includes the subject matter of Example 1 or 2, wherein separating the shredded waste material into the plurality of streams is performed using one or more vibrating deck screen.

Example 4 includes the subject matter of any of Examples 1-3, wherein separating each of the plurality of streams into a plurality of substreams is performed using a gravity separation table.

Example 5 includes the subject matter of any one of Examples 1-4, and further comprises collecting airborne or fine particles from the gravity separation table.

Example 6 includes the subject matter of Example 5, wherein collecting the airborne or fine particles is performed using one or more of a cyclone and a bag house.

Example 7 includes the subject matter of any one of Examples 1-6, wherein pulverizing the brittle components is performed using a dowel mill or impact crusher.

Example 8 includes the subject matter of any one of Examples 1-7, wherein the waste stream consists essentially of automobile shredder residue.

Example 9 is a process for separating metals from automobile shredder residue. In one embodiment, the process includes providing automobile shredder residue in a form of particles, wherein at least 95% of the particles have a size of less than 25 mm; separating, based on density, the particles into a plurality of streams; separating, based on mass, each of the plurality of streams into a first substream of particles of greater mass and a second substream of particles of lesser mass; pulverizing brittle components of each first substream of greater mass into a powder, leaving metallic components in sheet form; and separating the metallic components from each first substream after the pulverizing.

Example 10 includes the subject matter of Example 9, wherein the plurality of streams includes a first stream with particles having a size of less than 2 mm, a second stream with particles having a size between 2 mm and 6 mm, and a third stream with particles having a size of 6 mm or more.

Example 11 includes the subject matter of Examples 9 or 10, wherein the brittle components include one or more of glass, plastic, and rock.

Example 12 includes the subject matter of any one of Examples 9-11, wherein the metallic components comprise, in majority part, non-ferrous metals.

Example 13 includes the subject matter of any one of Examples 9-12, wherein the pulverizing is performed using an impact crusher.

Example 14 includes the subject matter of any one of Examples 9-13, and further comprises separating metallic components of the first substreams by size, thereby providing a first metals product and a second metals product.

Example 15 includes the subject matter of Example 14, wherein the first metals product comprises a majority portion of copper and has a density of at least 6 g/cm3.

Example 16 includes the subject matter of Example 15, wherein the first metals product comprises at least 80% copper by weight.

Example 17 includes the subject matter of any of Examples 14-16, wherein the second metals product comprises precious metals in majority portion.

Example 18 includes the subject matter of Example 17, wherein the second metals product comprises one or more of platinum, palladium, gold, and silver.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A process for recovering metal components from a waste stream, the process comprising:
    providing shredded material in a form of particles, wherein at least 95% of the particles have a size of less than 1 inch;
    separating, based on size, the particles into a plurality of streams comprising a first stream with particles in a first size range, a second stream with particles in a second size range greater than the first size range, and a third stream with particles in a third size range greater than the second size range;
    separating, using a gravity separation table, each of the plurality of streams into a first substream of greater density and a second substream of lesser density;
    pulverizing, using a vibratory dowel mill, the first substream of greater density of both of the first and second streams, leaving metallic components in flattened sheet form;
    collecting, after the pulverizing, the metallic components in flattened sheet form from the first substream of the first and second streams, wherein the metallic components in flattened sheet form comprise at least 60 wt. % copper; and
    collecting additional metallic components from the first substream of the third stream, wherein the additional metallic components comprise aluminum, copper, and steel.

2. The process according to claim 1, wherein the first size range is less than 2 mm, the second size range is between 2 mm and 6 mm, and the third size range is 6 mm or more.

3. The process according to claim 2, wherein separating the shredded waste material is performed using one or more vibrating deck screen.

4. The process according to claim 1, further comprising collecting airborne particles from the gravity separation table.

5. The process according to claim 4, wherein collecting the airborne particles is performed using one or more of a cyclone and a bag house.

6. The process according to claim 1, wherein the waste stream consists essentially of automobile shredder residue.

7. The process according to claim 1, wherein the first substream has a density of at least 6 g/cm³ and the second substream has a density of less than 6 g/cm³.

8. A process for separating metallic components from automobile shredder residue, the process comprising:
- providing automobile shredder residue in a form of particles, wherein at least 95% of the particles have a size of less than 25 mm;
- separating, based on size, the particles into a first stream of a first size range, a second stream of a second size range greater than the first size range, and a third stream of a third size range greater than the second size range;
- separating, based on mass, each of the plurality of streams into a first substream of particles of greater mass and a second substream of particles of lesser mass;
- processing, using a dowel mill, the first substream of the first and second streams, leaving metallic components in sheet form;
- collecting, after the pulverizing, the metallic components in flattened sheet form from the first substream of the first and second streams;
- collecting additional metallic components from the first substream of the third stream.

9. The process according to claim 8, wherein the first size range is 2 mm and smaller, the second size range is between 2 mm and 6 mm, and the third size range is 6 mm and larger.

10. The process according to claim 8, wherein processing, using the dowel mill, includes transforming brittle components into a powder, the brittle components including one or more of glass, plastic, and rock.

11. The process according to claim 8, wherein the metallic components comprise, in majority part, non-ferrous metals.

12. The process according to claim 8, further comprising separating metallic components of the first substream by size, thereby providing a first metals product and a second metals product.

13. The process according to claim 12, wherein the first metals product comprises a majority portion of copper and has a density of at least 6 g/cm³.

14. The process according to claim 13, wherein the first metals product comprises at least 80% copper by weight.

15. The process according to claim 12, wherein the second metals product comprises precious metals in majority portion.

16. The process according to claim 15, wherein the second metals product comprises one or more of platinum, palladium, gold, and silver.

17. The process according to claim 7, wherein the shredded material comprises automobile shredder residue.

* * * * *